United States Patent
Roth

(10) Patent No.: US 7,077,524 B2
(45) Date of Patent: *Jul. 18, 2006

(54) SEQUENTIAL PROJECTION COLOR DISPLAY USING MULTIPLE IMAGING PANELS

(75) Inventor: Shmuel Roth, Petach Tikva (IL)

(73) Assignee: Genoa Color Technologies LTD, Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/196,288

(22) Filed: Aug. 4, 2005

(65) Prior Publication Data

US 2005/0275806 A1  Dec. 15, 2005

Related U.S. Application Data

(63) Continuation of application No. 10/482,994, filed as application No. PCT/IL02/00558 on Jul. 10, 2002.

(60) Provisional application No. 60/304,455, filed on Jul. 12, 2001.

(51) Int. Cl.
*G03B 21/14* (2006.01)
*G03B 21/00* (2006.01)
*G03B 21/26* (2006.01)
*G03B 21/28* (2006.01)
*G03B 21/20* (2006.01)
*H04N 13/04* (2006.01)
*G02F 1/135* (2006.01)

(52) U.S. Cl. .................. 353/20; 353/31; 353/34; 353/82; 353/84; 353/99; 353/102; 348/57; 348/58; 349/30

(58) Field of Classification Search .......... 353/20, 353/31, 34, 82, 84, 99, 102; 348/42, 51, 348/54, 55, 57–58; 349/30

See application file for complete search history.

(56) References Cited

U.S. PATENT DOCUMENTS

| 4,390,893 | A | 6/1983 | Russell et al. |
| 4,843,573 | A | 6/1989 | Taylor et al. |
| 4,985,853 | A | 1/1991 | Taylor et al. |
| 5,042,921 | A | 8/1991 | Sato et al. |
| 5,416,890 | A | 5/1995 | Beretta |
| 5,455,600 | A | 10/1995 | Friedman et al. |
| 5,592,188 | A | 1/1997 | Doherty et al. |
| 5,650,942 | A | 7/1997 | Granger |
| 5,657,036 | A | 8/1997 | Markandey et al. |
| 5,863,125 | A | 1/1999 | Doany |
| 5,982,541 | A | 11/1999 | Li et al. |
| 6,097,367 | A | 8/2000 | Kuriwaki et al. |

(Continued)

FOREIGN PATENT DOCUMENTS

JP  8-86994  4/1996

(Continued)

OTHER PUBLICATIONS

U.S. Appl. No. 09/710,895, filed Nov. 14, 2000, David et al.

(Continued)

*Primary Examiner*—W. B. Perkey
*Assistant Examiner*—Magda Cruz
(74) *Attorney, Agent, or Firm*—Pearl Cohen Zedek Latzer, LLP

(57) ABSTRACT

A color projection display device may include SLMs or other panels. One embodiment includes a device for displaying a color image including first and second sequences of temporally-integrateable primary color image components, the device also includes first (209) ans second (206) SLM panels (604, 606), first and second driving circuitry, and first through fourth polarizing beam splitters.

19 Claims, 9 Drawing Sheets

U.S. PATENT DOCUMENTS

| | | | |
|---|---|---|---|
| 6,144,420 | A | 11/2000 | Jung |
| 6,147,720 | A | 11/2000 | Guerinot et al. |
| 6,198,512 | B1 | 3/2001 | Harris |
| 6,220,710 | B1 | 4/2001 | Raj et al. |
| 6,231,190 | B1 | 5/2001 | Dewald |
| 6,246,396 | B1 | 6/2001 | Gibson et al. |
| 6,262,744 | B1 | 7/2001 | Carrein |
| 6,280,034 | B1 | 8/2001 | Brennesholtz |
| 6,467,910 | B1 | 10/2002 | Sato |
| 2002/0109821 | A1 | 8/2002 | Hulbere et al. |
| 2004/0184005 | A1* | 9/2004 | Roth .................. 353/20 |

FOREIGN PATENT DOCUMENTS

| | | |
|---|---|---|
| JP | 2000253263 | 9/2000 |
| JP | 2000338950 | 12/2000 |
| WO | WO 95/10160 | 4/1995 |
| WO | WO 97/42770 | 11/1997 |
| WO | WO 01/95544 | 12/2001 |
| WO | WO 02/50763 | 6/2002 |
| WO | WO 02/099557 | 12/2002 |

OTHER PUBLICATIONS

Edward H. Stupp, Mathew S. Brennesholtz, Projection Displays, John Wiley and Sons, 1999, pp. 140-141 and 226-227.

Pointer, M. R., "The Gamut of Real Surface Colors", Color Research & Appl. 5(3): 145-155, 1980.

"A critical view of Spectral Models Applied to Binary Color Printing", Wyble and Berns, Color Research and Application, vol. 25, 2000, pp. 4-19.

Jeffrey A. Shimizu, "Scrolling Color LCOS for HDTV Rear Projection", SID 01 Digest, pp. 1072-1075.

Francisco H. Imai, Color Science; "Spectral reproduction from scene to hardcopy", Part 1-Multi-spectral acquisition ans spectral estimation using a Trichromatic Digital Camera System associated with absorbtion filters.

Rosen et al., "Spectral Reproduction from Scene to Hardcopy II", Image Processing. Munsell Color Science Laboratory, RIT-Proceedings of SPIE vol. 4300 (2001).

Gunter Wyszecki and W.S. Stiles, Color Science: Concepts and methods, Quantitative Data and Formulae, 2d Ed., 1982, pp. 179-183.

Ajito et al., "Expanded Color Gamut Reproduced by Six-Primary Projection Display", Proc. SPIE, vol. 2954 (2000) pp. 130-137.

Ajito et al., "Multiprimary Color Display for Liquid Crystal Display Projectors Using Diffraction Granting", Optical Eng. 38(11) 1883-1888 (Nov. 1999).

International Search Report for PCT/IL02/00558, mailed Dec. 6, 2002.

* cited by examiner

SEQUENTIAL PROJECTION COLOR DISPLAY USING MULTIPLE IMAGING PANELS

CROSS-REFERENCE TO RELATED APPLICATIONS

This Application is a Continuation of U.S. patent application Ser. 10/482,994, filed Jan. 8, 2004, as a National Phase Application of International Application No. PCT/IL02/00558, International Filing Date Jul. 10, 2002, which claims priority of U.S. Provisional Patent Application, 60/304,455, filed Jul. 12, 2001.

FIELD OF THE INVENTION

The Invention relates to color display devices generally and, more particularly, to optical configurations of sequential projection color display devices using multiple imaging panels.

BACKGROUND OF THE INVENTION

Standard computer monitors and TV displays are typically based on three additive primaries; namely, red, green, and blue, collectively denoted RGB. These monitors may not be able to display many colors perceived by humans, since they are limited in the range of colors they are capable of displaying.

Existing display devices can be divided into two groups, namely, direct view devices and projection devices. The direct view devices include CRT, LCD, LED and other types of display. In direct view devices, a display screen is composed of a plurality of, for example, RGB pixels, each pixel including a red sub-pixel element, a green sub-pixel element and a blue sub pixel element The color image is created by the viewer's visual system, which mentally integrates the colored light arriving from spatially neighboring sub-pixels to give a full color impression.

Projection display systems create images by projecting light on a viewing screen. There are generally two types of projection display systems, namely, simultaneous displays and sequential displays. Simultaneous projection display systems are based on projecting light of all primaries (e.g., three primaries) simultaneously onto to the viewing screen, whereby color combinations are perceived by spatial integration of the colors by the visual system of the viewer. Sequential projection display systems project separate images of the different primary colors onto the screen sequentially, at a sufficiently high frequency so that the human eye can perceive color combinations by temporal integration of the primary color images.

There are various types of Spatial Light Modulators (SLMs) for creating the patterns used to form the images displayed by projection display systems. For example, Liquid Crystal on Silicon (LCoS) devices or Digital Micromirror Devices (DMD™) may be used to create pixilated images for sequential projection devices. In designs of "optical engines" for producing the images displayed by projection display systems, different configurations of reflective, refractive, polarizing and filtering optical elements may be used in conjunction with at least one SLM.

A cross-sectional top-view of an optical engine of a prior art reflective LCoS projection display device, using a single LCoS panel, is illustrated schematically in FIG. 1. A device of this type is described, for example, in Edward H. Stupp, Mathew S. Brennesholtz, *Projection Displays*, John Wiley and Sons, 1999, the disclosure of which is incorporated herein by reference.

The device includes an illumination unit 101, consisting of one or more light sources, e.g., a plurality of high energy arc-lamps, typically high pressure mercury lamps as are known in the art, and beam shaping optics, e.g., integrating tunnel or lens-array type shaping optics as are known in the art. The light passes through a color wheel 102, which includes typically three, sequentially disposed, primary color filter segments, e.g., RGB filter segments, to produce a sequence of primary color image components. Color wheel 102 may be rotated, for example, by a rotation mechanism 112. In additional to the three primary color filter segments, color wheel 102 may optionally include a neutral filter segment, which may enhance the over-all illumination intensity of the display by providing periods of white-light illumination. The filtered light from color wheel 102 is transmitted, through a relay lens 103 and a Polarizing Beam-Splitter (PBS) 104, onto a LCoS panel 105. As is known in the art, only a p-polarization component of the imaging light is transmitted through PBS 104. LCoS panel 105 includes an array of pixel elements, which are selectively modulated, by driving electronics, to produce a sequence of patterns corresponding to a sequence of primary color image components, which are temporally integrated by the viewer to form the desired color image. Each pixel of he LCoS panel 105, when activated to an "on" state, converts the p-polarized light into corresponding s-polarized light, as is known in the art, and reflects the converted light back towards PBS 104. The converted s-polarized light is then reflected by PBS 104 onto a projection lens 106, or arrangement of lenses, which focuses the light on a display screen, e.g., a reflective display screen or diffusive (i.e., back-illuminated) display screen.

A drawback of the above configuration is the inherent loss of "second polarization" light, i.e., the s-polarization component of the original light tray through lens 103 and rejected by PBS 104. This loss of power can be reduced by implementing conversion techniques, as are known in the art, within illumination unit 101, for example, mechanical arrangements of polarizing filters, prisms and reflectors that convert some of the p-polarized light into s-polarized light; however, only up to about 50 percent of the lost light can be recovered using such elaborate techniques, due to systemic inefficiencies of the optical configurations used in implementing such techniques.

An optical engine including two DMD™ SLM panels has been used by the prior art to compensate for low intensity output in the red wavelength in early model high-pressure lamps. Such a two-panel configuration is described in detail in Edward H. Stupp, Mathew S. Brennesholtz, *"Projection Displays"* John Wiley and Sons, 1999 ("Stupp-Brennesholtz"), the disclosure of which is incorporated herein by reference. In this configuration, light from an illumination unit passes through a two-segment color wheel, wherein the two color segments are yellow and magenta. A color splitting prism directs either blue light (when the color wheel is in the "magenta" position) or green light (when the color wheel is in the "yellow" position) to a first DMD™ panel which modulates the blue and green color components of the image. In both positions of the color wheel red light is directed to a second DMD™ panel, which modulates the red color component of the image. The reflected illumination from both DMD™ panels is merged and projected through a projection lens, or arrangement of lenses. In this arrangement, the red light output deficiency of some early model white light sources is overcome by effectively doubling the display time of the red light component of the image. The color gamut of the resultant image is within the confines of the conventional RGB color gamut.

U.S. Pat. No. 6,280,034 ("the '034 patent"), the disclosure of which is incorporated herein by reference describes an imaging system including an illumination unit which has a broadband non-polarized white light source, and a polarization converter system (PCS), which converts the non-polarized light into polarized light of substantially a single polarization axis. The system of the '034 patent further includes a selective polarization filter which, based on control signals, rotates the polarization axis of a selected spectral band of the white light with respect to the remaining (i.e., complementary) spectral bands, producing two, complementary, orthogonal, polarized spectral components. The two spectral components are divided into separate light beams, using a polarized beam splitter (PBS), and each beam is separately modulated, using a spatial light modulator (SLM), to produce a desired image patter Using an additional PBS, the two image patterns are re-combined and projected onto a viewing screen. The selective polarization filter may include more than one region, e.g., a red filter region and a blue filter region, which may be used sequentially to produce a time-division-multiplexed color image. It should be noted that, in the configuration of the '034 patent, the intensity of the polarized light produced by the PCS does not recover the full intensity of the non-polarized light generated by the illumination unit; rather, only up to 30–60 percent of the lost light intensity may be recovered. Additionally, the selective polarization method of the '034 patent produces inherently complementary colored light beams, e.g., a red beam and a cyan beam, or a blue beam and a yellow beam. Consequently, the two separate light channels simultaneously modulated by the two SLMs of the '034 patent are co-dependent, in the sense that the colors of the two channels are inherently complementary. Therefore, although the arrangement of the '034 patent may improve image brightness, the inherent co-dependency of the two channels limits the color gamut that can be produced by the system to the confines of a conventional RGB color gamut.

SUMMARY OF THE INVENTION

Optical engine configurations in accordance with embodiments of the invention include two pixilation devices, such as SLM panels, used in conjunction with one or two color switching mechanisms, for example, two color wheels, each providing a different set of primary colors, for projecting more-than-three primary color images with improved illumination efficiency. The systems of the invention are conveniently adaptable to existing designs of RGB sequential projection systems, and provide more-than-three-primary color images with an over-all light throughput much higher than, e.g., twice, that of conventional, single panel, RGB projection systems. Two-panel configurations in accordance with embodiments of the invention enable the use of substantially all polarized light typically rejected by the optical engines of existing display systems.

Driving electronics for existing SLM devices, e.g., DMD™ or LCoS based devices, are typically configured to operate with a three- or four-segment color switching mechanism, for example, a three-segment RGB color wheel, or a four-segment color wheel including a "Site" segment in addition to the RGB segments. Modifying existing three- or four-color wheels for use with more than three primary colors, in accordance with some embodiments of the invention, may not require a significant change in the driving electronics. In some embodiments of the invention, two color wheels, each having up to four color segments, are used simultaneously to reproduce a more-than-three primary color image, for example, a four- to seven-primary color image, e.g., a six-primary color image. The simultaneous use of two color Wheels, each providing a different (or partially overlapping) set of primary colors, in accordance with embodiments of the invention, results in a duty cycle for each of the at least four primary colors (i.e., a fraction of the projection time assigned to each primary color) at least equal to the duty cycle of each primary color in existing, single color-wheel, RGB projection systems. By allocating to each primary color a display time comparable to the display time allocated to each primary in a conventional RGB system, a more-than-three primary display system of the invention avoids possible reduction in bit depth of the displayed image.

In other embodiments of the invention, a single color switching mechanism, e.g., a single color wheel having three primary color segments, is used in an optical engine configuration including two SLM panels, to produce images of more-than-three primary colors at high illumination efficiencies. In such embodiments, more than three, e.g., six, independent primary color image components may be reproduced using different combinations of the three primary colors produced by the color switching mechanism and additional components of the system.

In accordance with embodiments of one aspect of the invention, there is provided a color projection display device for displaying a temporally-integrated color image including first and second sequences of temporally-integrateable primary color image components, the device including a first SLM panel including a first array of pixel elements, a second SLM panel including a second array of pixel elements, first driving circuitry which receives a first input signal representing the first sequence of temporally-integrateable primary color image components and selectively activates the first array of pixel elements to produce a first sequence of reflective patterns corresponding to the first sequence of temporally-integrateable primary color image components, each pattern in the first sequence of reflective patterns adapted to receive p-polarized incident light and to reflect corresponding s-polarized light, second driving circuitry which receives a second input signal representing the second sequence of temporally-integrateable primary color image components and selectively activates the second array of pixel elements to produce a second sequence of reflective patterns corresponding to the second sequence of temporally-integrateable primary color image components, each pattern in the second sequence of reflective patterns adapted to receive s-polarized incident light and to reflect corresponding p-polarized light, an illumination unit which generates a non-polarized, substantially white, light beam, a first PBS which separates the non-polarized light beam into a substantially white p-polarized light beam and a substantially white s-polarized light beam, a first color switching mechanism which sequentially interposes each of a first set of primary color filter segments in the path of the substantially white p-polarized light beam to produce a sequence of p-polarized colored light beams whose colors correspond to the colors of the first sequence of temporally-integrateable primary color image components, a second PBS which transmits the sequence of p-polarized colored light beams onto the first SLM panel, receives a sequence of patterned s-polarized colored light beams reflected from the first SLM panel, each patterned s-polarized colored light beam carrying one primary color image component in the first sequence of temporally-integrateable primary color image components, and deflects the sequence of patterned s-polarized colored light beams, a second color switching mechanism which sequentially interposes each of a second set of primary color filter segments in the path of the substantially white s-polarized light beam to produce a sequence of s-polarized colored light beams whose colors correspond to the colors of the second sequence of temporally-integrateable primary color image components, a third PBS which deflects the sequence of s-polarized colored light beams onto the second SLM panel, receives a sequence of patterned p-polarized colored light beams reflected from the second SLM panel, each patterned p-polarized colored light beam carrying one primary color image component in the second sequence of temporally-integrateable primary color image components, and transmits the sequence of patterned p-polarized colored light beams, and a fourth PBS which transmits the sequence of patterned p-polarized colored light beams transmitted by the third PBS and deflects the sequence of patterned s-polarized colored light beams deflected by the second PBS, thereby to produce a combined output beam carrying both the first sequence and the second sequence of temporally-integrateable primary color image components.

Further, in accordance with embodiments of this aspect of the invention, the device includes at least one projection lens which projects the combined output beam onto a viewing screen to reproduce the temporally-integrated color image. In embodiments of the invention, the first color switching mechanism includes a first color wheel which accommodates the first set of primary color filter segments, and means for rotating the first color wheel to sequentially dispose each of the first set of primary color filter segments in the path of the substantially white p-polarized light beam, and the second color switching mechanism includes a second color wheel which accommodates the second set of primary color filter segments, and means for rotating the second color wheel to sequentially dispose each of the second set of primary color filter segments in the path of the substantially white s-polarized light beam. In some embodiments of the invention, at least one of the first and second color wheels further accommodates a transparent segment which transmits substantially the entire light spectrum generated by the illumination unit. The device may further include a collimating lens, which collates the non-polarized, substantially white, light beam. In some embodiments of the invention, at least one of the first and second sets of primary color filter segments includes three different color filter segments. In embodiments of the invention, each of the first and second SLM panels includes an LCoS panel and each of the first and second arrays of pixel elements includes an array of selectively activated LCoS pixel elements.

In accordance with embodiments of a further aspect of the invention, there is provided a color projection display device for displaying a temporally-integrated color image including first and second sequences of temporally-integrateable primary color image components, the device including a first SLM panel including a first array of pixel elements, a second SLM panel including a second array of pixel elements, first driving circuitry which receives a first input signal representing the first sequence of temporally-integrateable primary color image components and selectively activates the first array of pixel elements to produce a first sequence of reflective patterns corresponding to the first sequence of temporally-integrateable primary color image components, each pattern in the first sequence of reflective patterns adapted to reflect incident light, second driving circuitry which receives a second input signal representing the second sequence of temporally-integrateable primary color image components and selectively activates the second array of pixel elements to produce a second sequence of reflective patterns corresponding to the second sequence of temporally-integrateable primary color image components, each pattern in the second sequence of reflective patterns adapted to reflect incident light, an illumination unit which generates a non-polarized, substantially white, light beam, a first PBS which separates the non-polarized light beam into a substantially white p-polarized light beam and a substantially white s-polarized light beam, a first color switching mechanism which sequentially interposes each of a first set of primary color filter segments in the path of the substantially white p-polarized light beam to produce a sequence of p-polarized colored light beams whose colors correspond to the colors of the first sequence of temporally-integrateable primary color image components, a first TIR prism which transmits the sequence of p-polarized colored light beams onto the first SLM panel, receives a sequence of patterned p-polarized colored light beams reflected from the first SLM panel, each patterned p-polarized colored light beam carrying one primary color image component in the first sequence of temporally-integrateable primary color image components, and deflects the sequence of patterned p-polarized colored light beams, a second color switching mechanism which sequentially interposes each of a second set of primary color filter segments in the path of the substantially white s-polarized light beam to produce a sequence of s-polarized colored light beams whose colors correspond to the colors of the second sequence of temporally-integrateable primary color image components, a second TIR prism which deflects the sequence of s-polarized colored light beams onto the second SLM panel, receives a sequence of patterned s-polarized colored light beams reflected from the second SLM panel, each patterned s-polarized colored light beam carrying one primary color image component in the second sequence of temporally-integrateable primary color image components, and transits the sequence of patterned s-polarized colored light beams, and a second PBS which transmits the sequence of patterned p-polarized colored light beams deflected by the first TIR prism and deflects the sequence of patterned s-polarized colored light beams transmitted by the second TIR prism, thereby to produce a combined output beam carrying both the first sequence and the second sequence of temporally-integrateable primary color image components.

Further, in accordance with embodiments of this aspect of the invention, the device includes at least one projection lens which projects the combined output beam onto a viewing screen to reproduce the temporally-integrated color image. In embodiments of the invention, the first color switching mechanism includes a first color wheel which accommodates the first set of primary color filter segments and means for rotating the first color wheel to sequentially dispose each of the first set of primary color filter segments in the path of the substantially white p-polarized light beam, and the second color switching mechanism includes a second color wheel which accommodates the second set of primary color filter segments and means for rotating the second color wheel to sequentially dispose each of the second set of primary color filter segments in the path of the substantially white s-polarized light beam. In some embodiments, at least one of the first and second color wheels further accommodates a transparent segment which transmits substantially the entire light spectrum generated by the illumination unit.

The device may further include a collimating lens, which collimates the non-polarized, substantially white, light beam In some embodiments, at least one of the first and second sets of primary color filter segments includes three different color filter segments. In embodiment of the invention, each of the first and second SLM panels includes a DMD™ panel and each of the first and second arrays of pixel elements includes an array of selectively activated micro-mirror pixel elements.

In accordance with embodiments of an additional aspect of the invention, there is provided a color projection display system for displaying a temporally-integrated color image including first and second sequences of temporally-integrateable primary color image components, the system including a color projection display device as described above, a data converter which converts an input signal representing three-primary-color image pixel data into a converted data signal representing the temporally-integrated color image, a data splitter which separates the converted data signal into the first and second input signals representing the first and second sequences of temporally-integrateable primary color image components, respectively, and first and second color-switching control units which control the rates at which the first and second color switching mechanism, respectively, sequentially interpose the first and second sets of primary color filter segments, respectively.

In some embodiments of this aspect of the invention, the system further includes means for synchronizing between the fist and second color-switching control units and the first and second driving circuitry, respectively, thereby to adapt the rate at which the first and second color-switching mechanisms sequentially interpose the first and second sets of primary color filter segments, respectively, to the rates at which the first and second driving circuitry produce the first and second sequences of reflective patterns, respectively. In some embodiments of the invention, the three-primary-color image pixel data includes image pixel data in a format selected from the group consisting of RGB, YCbCr and CMYK. In embodiments of the invention, the temporally integrated color image may include at least four, at least five, or at least six temporally-integrateable primary color image components.

In accordance with embodiments of yet another aspect of the invention, there is provided a color projection display device for displaying a temporally-integrated color image including first and second sequences of temporally-integrateable primary color image components, the device including a first SLM panel including a first array of pixel elements, a second SLM panel including a second array of pixel elements, first driving circuitry which receives a first input signal representing the first sequence of temporally-integrateable primary color image components and selectively activates the first array of pixel elements to produce a first sequence of reflective patterns corresponding to the first sequence of temporally-integrateable primary color image components, second driving circuitry which receives a second input signal representing the second sequence of temporally-integrateable primary color image components and selectively activates the second array of pixel elements to produce a second sequence of reflective patterns corresponding to the second sequence of temporally-integrateable primary color image components, an illumination unit which generates a substantially white light beam, a color switching mechanism which sequentially interposes each of at least three different color filter segments in the path of the substantially white light beam, each color filter segment having a different wavelength transmission spectrum, to produce a sequence of at least three, respective, color filtered light beams, and a beam-splitting prism which separates each color filtered light beam in the sequence of at least three color filtered light beams into a first sub-spectrum beam whose color corresponds to the color of one of the primary color image components in the first sequence of temporally-integrateable primary color image components and a second sub-spectrum beam whose color corresponds to the color of one of the primary color image components in the second sequence of temporally-integrateable primary color image components, directs each the first sub-spectrum beam onto the first SLM panel, directs each the second sub-spectrum beam onto the second SLM panel, receives a first sequence of patterned colored light beams reflected from the first SLM panel, each patterned colored light beam in the first sequence of patterned colored light beams carrying one primary color image component in the first sequence of temporally-integrateable primary color image components, receives a second sequence of patterned colored light beams reflected from the second SLM panel, each patterned colored light beam in the second sequence of patterned colored light beams cow one primary color image component in the second sequence of temporally-integrateable primary color image components, and directs both the first sequence and the second sequence of patterned colored light beams in an output direction, thereby to produce a combined output beam carrying both the first sequence and the second sequence of temporally-integrateable primary color image components.

Further, in some embodiments of this aspect of the invention, the device includes at least one projection lens which projects the combined output beam onto a viewing screen to reproduce the temporally-integrated color image. In embodiments of the invention, the color switching mechanism includes a color wheel which accommodates the at least three color filter segments and means for rotating the color wheel to sequentially dispose each of the at least three color filter segments in the path of the substantially white light beam. In some embodiments, the device may further include a collimating lens, which collimates the sequence of color filtered light beams. In some embodiments of the invention, the first and second sub-spectrum beams include beams of at least four, at least five, or at least six different primary colors. In embodiments of the invention, each of the first and second SLM panels includes a DMD™ panel, and each of the first and second arrays of pixel elements includes an array of selectively activated micro-mirror pixel elements.

In accordance with embodiments of a still further aspect of the invention, there is provided a color projection display system for displaying a temporally-integrated color image including first and second sequences of temporally-integrateable primary color image components, the system including a color projection display device as described above, a data converter which converts an input signal representing three-primary-color image pixel data into a converted data signal representing the temporally-integrated color image, a data splitter which separates the converted data signal into the first and second input signals representing the first and second sequences of temporally-integrateable primary color image components, respectively, and a color-switching control unit which controls the rate at which the color-switching mechanism sequentially interposes the at least three color filter segments.

Further, in some embodiments of this aspect of the invention, the system includes means for synchronizing between the color-switching control unit and the first and second driving circuitry, thereby to adapt the rate at which the color-switching mechanism sequentially interposes the at least three different color filter segments, respectively, to the rate at which the first and second driving circuitry produce the first and second sequences of reflective patterns. In embodiments of the invention, the three-primary-color image pixel data includes image pixel data in a format selected from the group consisting of RGB, YCbCr and CMYK.

BRIEF DESCRIPTION OF THE DRAWINGS

The invention will be understood and appreciated more fully from the following detailed description of exemplary embodiments of the invention, taken in conjunction with the accompanying drawings, in which.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will be apparent to one skilled in the art that the present invention may be practiced without the specific details presented herein. Furthermore, well known features may be omitted or simplified to avoid obscuring the present invention.

Figure 1:
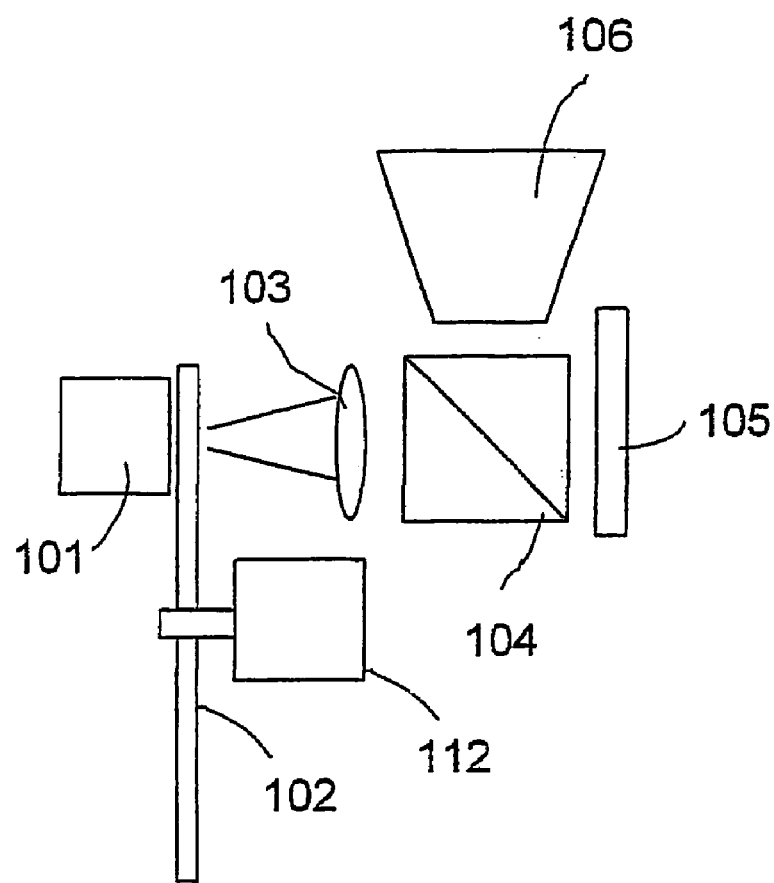
FIG. 1 is a schematic, cross-sectional, top-view illustration of an optical engine configuration of a typical prior art reflective LCoS color projection display system, using a single SLM panel.
Figure 2:
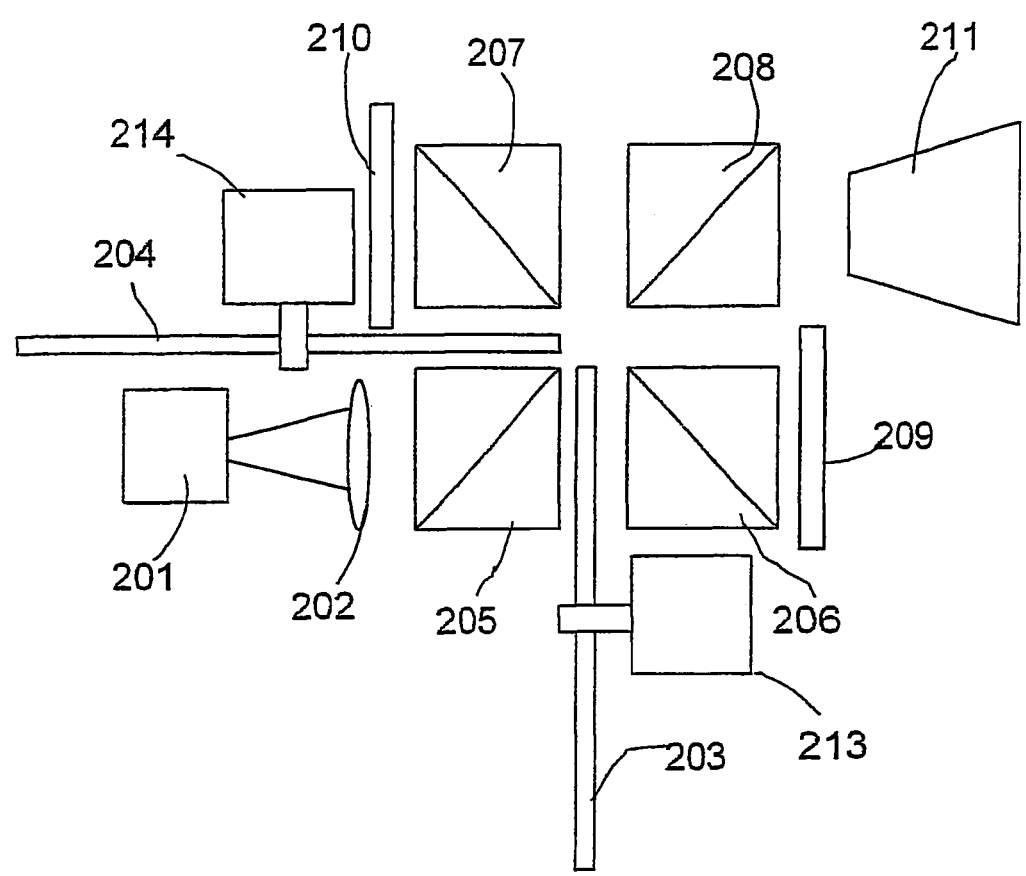
FIG. 2 is a schematic, cross-sectional, top-view illustration of an optical engine configuration of a color projection display system, using two reflective LCoS SLM panels and two color-switching mechanisms, in accordance with exemplary embodiments of the invention.

Reference is now made to FIG. 2, which schematically illustrates a cross-sectional top view of an optical engine configuration for a more-than-three-primaries color projection display system, using two LCoS SLM panels, in accordance with an embodiment of the invention In this embodiment, non-polarized light from an illumination unit 201, which may include at least one white light source, for example, the UHP™ lamp available from Philips Lighting, a cold filter, and a homogenizing component, as are known in the art, is collimated by a relay lens 202, which may include any type of relay lens known in the, onto a first Polarizing Beam-Splitter (PBS) 205. PBS 205, which may include any suitable type of PBS component known in the art, separates the non-polarized light into two polarization components, namely, a p-polarization component and an s-polarization component. In alternate embodiments of the invention, other suitable components and/or other suitable arrangements of components may be used. For example, pixilation devices other than SLMs may be used.

The p-polarized light component is transmitted through one of a plurality of filter segments of a first color switching mechanism 213, which may include a first color wheel 203, as described in detail below with reference to FIG. 7A. The filtered light passes through a second PBS 206, and then selectively reflected from the surface of a first LCoS panel 209, which includes an array of pixel elements modulated by driving circuitry, as described below with reference to FIG. 6. The reflection angle is normal to the surface of first LCoS panel 209. Each pixel element of first LCoS panel 209, when activated to an "on" state, rotates the polarization of the p-polarized into s-polarization, thereby reflecting a pattern of s-polarized, colored, light. The patterned s-polarized light, on its return path from first LCoS panel 209, is deflected by second PBS 206, e.g., at an angle of approximately ninety degrees, towards a third PBS 208, which deflects the patterned colored light onto a projection lens 211, or arrangement of lenses, thereby to project the colored pattern onto a viewing screen, as is known in the art.

As further shown in FIG. 2, the s-polarized component of the light emanating from illumination unit 201 is deflected by first PBS 205 and transmitted through one of the filter segments of a second color switching mechanism 214, which may include a second color wheel 204, as described in detail below with reference to FIG. 7B. The color filtered light from color-wheel 304 is deflected by a fourth PBS 207, and then selectively reflected from the surface of a second LCoS panel 210, which includes an array of pixel elements modulated by driving circuitry, as described below with reference to FIG. 6. The reflection angle is normal to the surface of LCoS panel 210, which converts the s-polarized light into selectively patterned, p-polarized, colored light On its return path from LCoS panel 210, the p-polarized patterned light passes through fourth PBS 207 and third PBS 208, and projected by projection lens 211 onto the viewing screen.

Figure 7A:
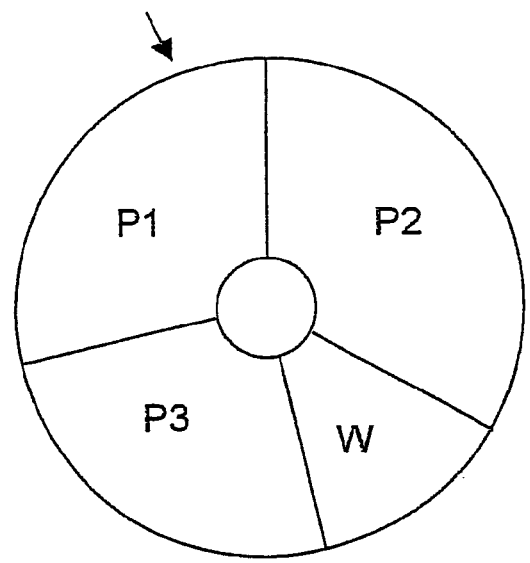
FIGS. 7A and 7B are schematic, side view, illustrations of two exemplary color wheel designs for the two color switching mechanisms, respectively, of the optical engine configurations of FIGS. 2 and 3.
Figure 7B:
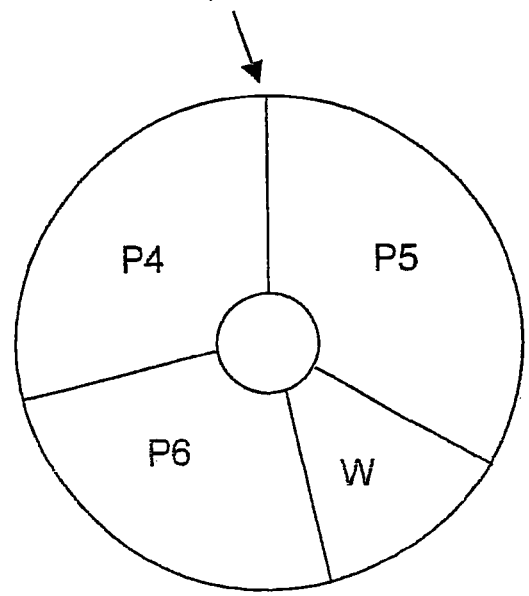

FIGS. 7A and 7B schematically illustrate side views of color wheels 203 and 204, respectively, of FIG. 2, or color wheels 303 and 304, respectively, of FIG. 3, described below, according to an exemplary embodiment of the invention As explained above, color wheel 203 may include a first set of primary color filter segments, denoted P1, P2 and P3, for example, red, green and blue (collectively: "RGB") filter segments, and color wheel 204 may include a second set of color filter segments, denoted P4, P5 and P6, for example, cyan, magenta and yellow (collectively: "CMY") filter segments. Additionally, in some embodiments, either or both color wheels 203 and 204 may include a neutral, transparent, filter segment, denoted "W" in FIGS. 7A and 7B, which may increase the over-all brightness of the image, as is known in, the art. It will be appreciated by persons skilled in the art that the two color-wheel configuration, in accordance with embodiments of the invention, enables the use of existing color-wheel designs, with appropriate changes in the color filter segments, obviating the need to design new color switching mechanisms. Further, because each of LCoS panels, 209 and 210, may in some embodiments control only up to three or four color components, the driving electronics for driving LCoS panels 209 and 210, as described below, may be based on existing designs of driving electronics for sequential RGB displays using a single color wheel. These accommodations may simplify the implementation of the present invention on existing display devices, to provide a more-than-three primary, dual-sequential, projection display system In other embodiments, different color filter configuration may be used, for example, more than three different primary colors may be used on either or both color wheels 203 and 204, or the primary colors used by the two color wheels may partially or completely overlap, in accordance with specific design considerations.

Figure 8A:
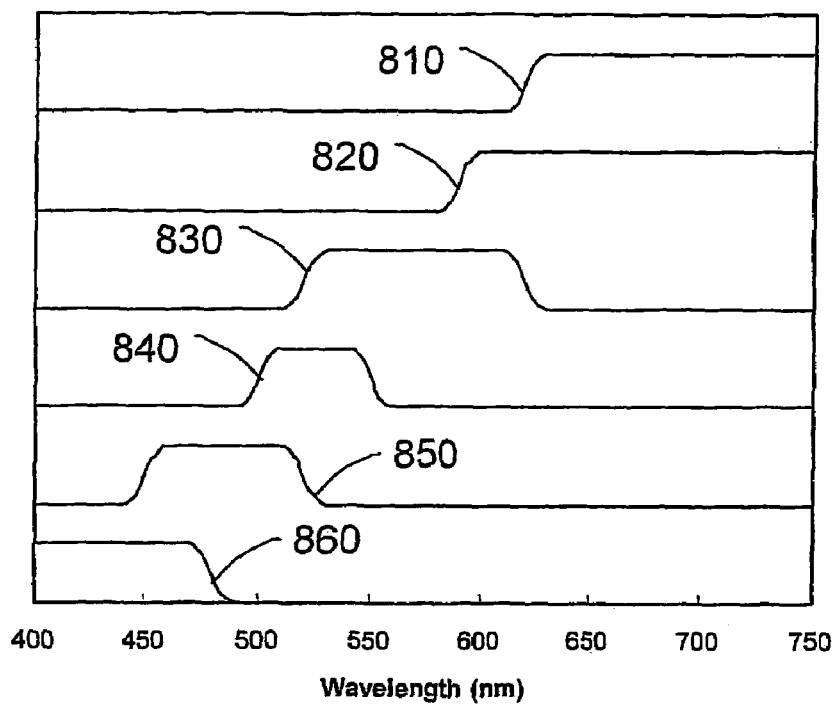
FIG. 8A is a schematic illustration of curves representing exemplary wavelength ranges for filter segments of the color wheels of FIGS. 7A and 7B.
Figure 8B:
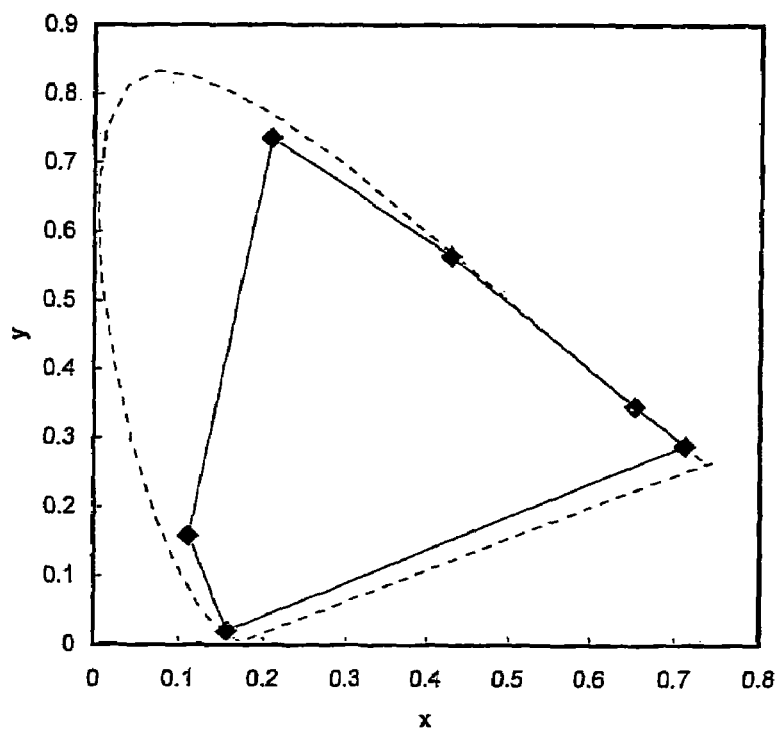
FIG. 8B is a schematic illustration of a chromaticity diagram showing the color gamut coverage resulting from the exemplary wavelength ranges of FIG. 8A.

FIG. 8A schematically illustrates curves representing exemplary wavelength transmission ranges 810, 820, 830, 840, 850 and 860, of the color filter segments P1, P2, P4, P5 and P6 of color wheels 203 and 204 (or 303 and 304) of FIGS. 7A and 7B. A chromaticity diagram showing the color gamut coverage resulting from the exemplary wavelength ranges of FIG. 8A is illustrated schematically in FIG. 8B. The exemplary filter selection of FIG. 8A includes two, slightly different, red filter segments, 810 and 820, a yellow filter segment, 830, a green filter segment 840, a cyan filter segment 850, and a blue filter segment 860. The use of two similar red filters may be advantageous because it enables the display system to reproduce images with sufficiently bright and saturated red colors and sufficiently saturated magenta colors. It should be appreciated by persons skilled in the art that, in the above configuration, both polarization components of the imaging light are efficiently used to produce the projected image, yielding a light output and, consequently, an image brightness, approximately twice that of a conventional, single panel, optical engine configuration. Further, standard three- or four-color wheel designs and driving electronics may be used as components for the color switching mechanisms of the more-than-three primary color displays in accordance with embodiments of the invention, as explained above. In addition, the specific spectra transmitted by the different color filter segments on each of color wheels 203 and 204 may be selected to obtain an optimal balance of intensity for the different primary colors, so that the combined light intensities transmitted through corresponding primary color segments of the two color wheels may be comparable. This may be helpful, for example, in reducing undesired visual effects, such as "flicker", as are known in the art. The spectrums for the specific color wheel filter-segments used may also be adjusted to provide optimal contrast of the two polarization components (i.e., "p" and "s"), according to the PBS specifications. This is because the polarization properties of the PBS component may be wavelength-dependent For example, the use of narrower wavelength ranges may improve the separation between the "p" and "s" polarization components and, thus, enhance the image contrast.

In some embodiments, the use of two color wheels, as described above, enables construction of an optical engine with up to six primary colors, each color wheel providing three primary colors, 11n existing designs of three-color driving electronics for LCoS panels 209 and 210. In some embodiments of the invention, the system may be operated in a RGBW mode, wherein two identical RGBW color-wheels, e.g., two RGB color-wheels, each having a neural (i.e., fully transparent) filter segment, as shown in FIG. 7A, are used to produce a brightness three-primary color image with white light augmentation. Other suitable combinations of two color wheels, each having three or four filter segments, may be used to produce color images having desired qualities, in accordance with specific implementations of the invention. Whether color wheels 203 and 204 are identical or have different (or partially or completely overlapping) sets of primary colors, in some embodiments of the invention the color wheels, and the corresponding LCoS panels or other devices which create the pixilated light patterns, need not be precisely synchronized. This is because, typically, the light of sequential primary color frames is temporally combined by the human vision system, whereby the viewed image is affected by the average intensities and illumination times of the different primary colors and not by the exact timing of the different frames. Thus, in some embodiments, the filter segments of the two color wheels may have different sizes, i.e., the illumination time for each primary color may be different in each wheel. It should be noted that the temporal light modulation of the two-wheel embodiment described above may be twice as fast as that of a corresponding single panel configuration, improving the "flicker" response of the display. Additionally, in embodiments of the invention, the arrangement of filter-segments on each of the two color wheels and the relative temporal phase set between the two wheels may be adjusted to further minimize 'flicker' effects; for example, the temporal sequence of light modulation for white frames may be such that the first harmonic of a time varying brightness signal is minimized.

Of course, in other embodiments, other primaries may be used, and each color wheel may include more than four or less than three color segments.

According to additional embodiments of the invention, DMD™ panels, as are known in the ark may be used instead of the LCoS panels described above. It is appreciated that DMD™ panel configurations do not have the polarization loss problems associated with LCoS panels. Therefore, in embodiments of the invention, configurations based on two DMD™ panels may be used primarily to enable reproduction of more-than-three primary color images using standard, e.g., three- or four-color wheels, and conventional driving electronics, as described above. FIG. 3 schematically illustrates a cross-sectional top view of an optical configuration for a more-than-three primary color projection system in accordance with embodiments of the invention, using two DMD™ panels and two color wheels. Other than the use of DMD™ panels, the configuration of FIG. 3 is generally similar to the configuration described above with reference to FIG. 2; however, the configuration of FIG. 3 is adapted to accommodate the specific properties of DMD™ panels. First, the configuration of FIG. 3 takes into account the fact that, with DMD™ panels, there is no loss of light intensity due to polarization conversion, as in the LCoS panels described above. Second, the geometry of the configuration of FIG. 3 is adapted to accommodate off-normal reflection angles from the DMD™ panels. Accordingly, as shown in FIG. 3, first and second Total Internal Reflection (TIR) prisms, 306 and 307, respectively, may be used instead of second PBS 206 and fourth PBS 207 of the embodiment of FIG. 2.

Light from an illumination source 301 is collimated by a lens 302, or by a reflector placed behind the illumination source, and a first PBS 305 splits the collimated light into "s" and "p" polarization components. The p-polarized light is filtered by one of the filter-segments of a first color switching mechanism 313. which may include a first color wheel 303 (also shown in FIG. 7A). The filtered light passes through first TIR prism 306 to illuminate a first DMDTM 309, which includes an array of selectively activated micro-mirrors, as is known in the art. Each activated micro-mirror, i.e., eaeh micro-mirror in an "on" position, reflects the impinging light at an off-normal angle, for example, +10 degrees off normal. The selectively reflected (i.e., patterned) light, which carries a primary color image component, is deflected by the total reflection surface of first TIR prism 306 and thus directed towards a second PBS 308, which combines the p-polarized image component with a simultaneously produced s-polarized image component, as described below.

The s-polarized light component is filtered through one of the filter-segments of a second color switching mechanism 314, which may include a second color wheel 304 (also shown in FIG. 7B). The colored filtered light is deflected by the total reflection surface of the second TIR prism 307 towards a second DMDTM 310, which includes an array of selectively activated micro-mirrors, as is known in the art. Each activated micro-mirror reflects the impinging light at an off-normal angle, for example, +10 degrees off normal, back towards TIR prism 307. The selectively reflected (i.e., patterned) light, which carries a primary color image component, passes through TIR prism 307, and is combined with the p-polarized primary color image component at second PBS 308. A projection lens 311, or arrangement of lenses, focuses the combined s- and p-polarized primary color image components onto a viewing screen (not shown) of the display system, as is known in the art. It will be appreciated by persons skilled in the art that other features of the embodiment of FIG. 3, not specifically described herein, are substantially analogous to similar features of the embodiment of FIG. 2 above.

Figure 4A:
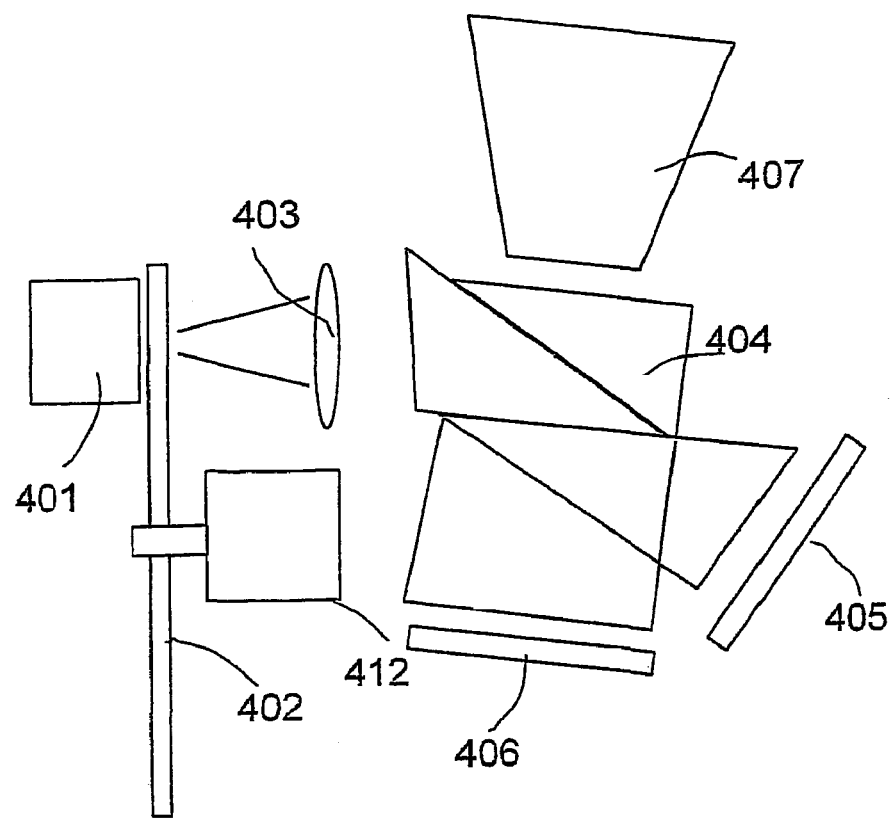
FIG. 4A is a schematic, cross-sectional, top-view illusion of an optical engine configuration of a color projection display system, using two DMD™ SLM panels and a single color-switching mechanism, in accordance with exemplary embodiments of the invention.

According to further embodiments of the invention, an optical engine using two DMD™ panels is used in conjunction with a single color switching mechanism, e.g., a single color wheel, to sequentially reproduce more than three different primary color image components. The basic geometry of an optical engine according to embodiments of this aspect of tie invention, a cross-sectional top view of which is illustrated schematically in FIG. 4A, is generally similar to a three-primary color optical engine described in Edward H. Stupp, Mathew S. Brennesholtz, *"Projection Displays*, John Wiley and Sons, 1999, the disclosure of which is incorporated herein by reference. However, in contrast to this prior art optical engine, the optical engine of FIG. 4A uses a three-filter color switching mechanism, including a three-segment color wheel, as described in detail below, to produce more than three, e.g., six, primary colors.

Figure 4B:
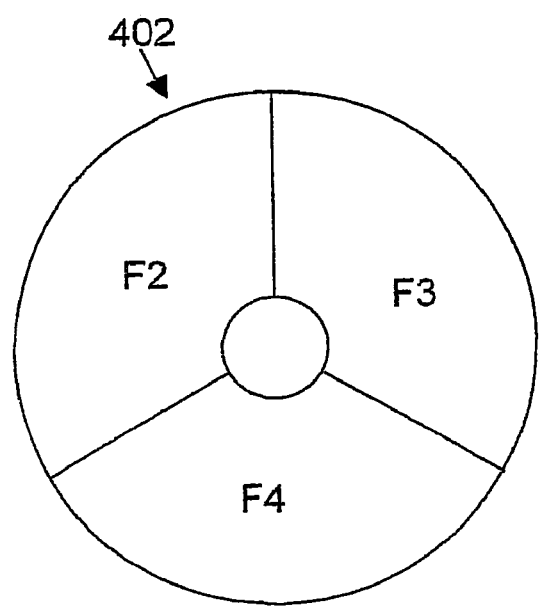
FIG. 4B is a schematic,- side view, illustration of a color wheel which may be used by the color-switching mechanism of FIG. 4A.
Figure 5A:
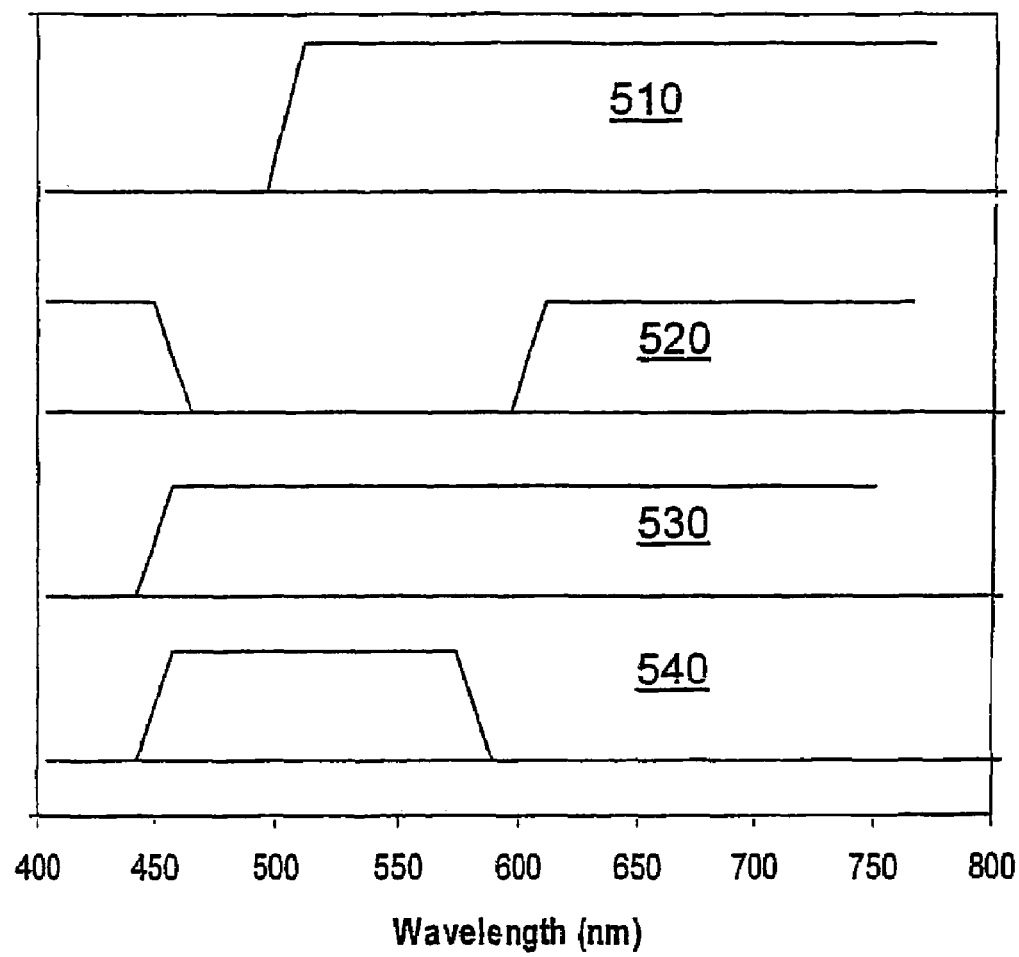
FIG. 5A is a schematic illustration of wavelength transmission curves of a color-splitting element used by the optical engine of FIG. 4A and three filter segments of the color wheel of FIG. 4B, in accordance with an exemplary embodiment of the invention.
Figure 5B:
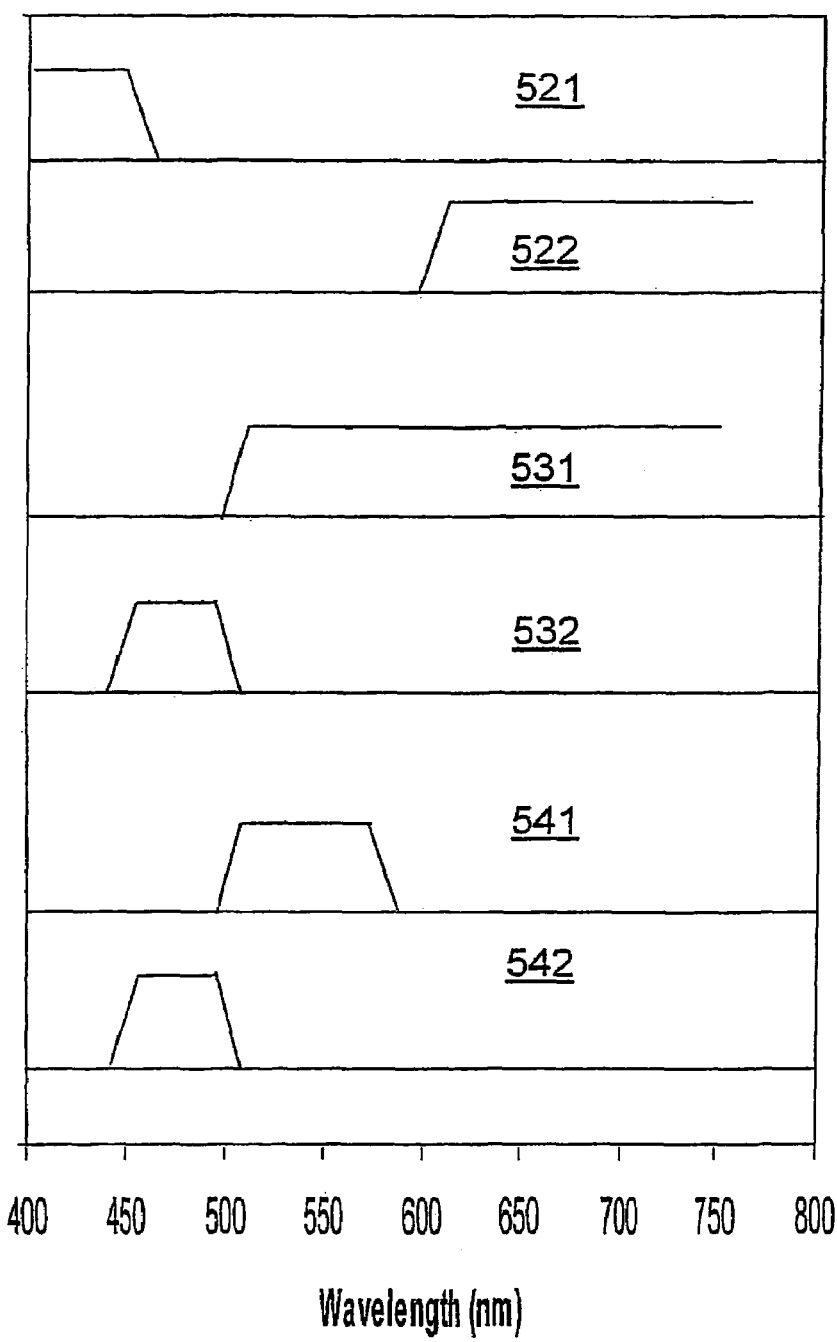
FIG. 5B is a schematic illustration of curves representing primary color spectra resulting from combinations of the wavelength transmission curves of FIG. 5A, in accordance with an exemplary embodiment of the invention.

FIG. 4B schematically illustrates a side view of a three-segment color wheel 402 used by the optical engine of FIG. 4A. FIG. 5A schematically illustrates exemplary selection of a transmission curve 510 for a color-splitting prim 404 used by the optical engine of FIG. 4A, and wavelength ranges 520, 530 and 540 for filter segments F2, F3 and F4 of color wheel 402. FIG. 5B schematically illustrates six, exemplary, primary color spectra resulting from combinations of the wavelength ranges and transmission curve of FIG. 5A, in accordance with an exemplary embodiment of the invention.

Referring to FIGS. 4A, 4B, 5A and 5B, white light from illumination unit 401 passes through one of the three segments, F2, F3 or F4, of 3-segment color wheel 402 of a color switching mechanism 412, producing filtered light in one of the wavelength ranges, 520, 530 or 540, respectively, in FIG. 5A. When color wheel 402 is in the F2 segment position, color-splitting prism 404 directs part of the filtered light spectrum, e.g., spectrum 521 in FIG. 5B, to a first DMD™ panel 405, and another part of the filtered light spectrum, e.g., spectrum 522 in FIG. 5B, to a second DMD™ panel 406. When color wheel 402 is in the F3 segment position, color-splitting prism 404 directs part of the filtered light spectrum, e.g., spectrum 531 in FIG. 5B, to first DMD™ panel 405, and another part of the filtered light spectrum e.g., spectrum 532 in FIG. 5B, to second DMD™ panel 406. When color wheel 402 is in the F4 segment position, color-splitting prism 404 directs part of the filtered light spectrum, e.g., spectrum 541 is 5B, to first DMD™ panel 405, and another part of the filtered light spectrum, e.g., spectrum 542 in FIG. 5B, to second DMD™ panel 406. A projection lens 407, or arrangement of lenses, projects all the reflected illumination, from both DMD™ panel 405 and DMD™ panel 406, onto a viewing screen (not shown) of the display system. It will be appreciated by persons skilled in the art that the combination of three-primary-color wheel 402 and color-splitting prism 404 allows substantially independent reproduction of six different primary color image components. As explained above, FIG. 5A schematically illustrates exemplary selection of wavelength ranges for the color filter segments of color wheel 402 and a transmission curve for prism 404. Transmission curve 510 is an exemplary transmission curve for color-splitting prism 404, wherein wavelength ranges not transmitted by color-splitting prism 404 are reflected by prism 404. Thus, prism 404 splits wavelength ranges 520, 530 and 540, of the three filter segments of color wheel 402, as shown schematically in FIG. 5B. In the example provided herein, for segment F2 (range 520 in FIG. 5A), panels 405 and 406 reproduce blue and red image components (521 and 522 in FIG. 5B), respectively. For segment F3 (range 530 in FIG. 5A), panels 405 and 406 reproduce yellow and cyan image components (531 and 532 in FIG. 5B), respectively. For segment F4 (range 540 in FIG. 5A), panels 405 and 406 reproduce green and cyan image components (541 and 542 in FIG. 5B), respectively. It should be noted that the transmission spectra of FIGS. 5A and 5B are given for illustration only, and many other transmission spectra selections are also within the scope of the invention. In embodiments of the invention, the transmission spectra of prism 404 and the filter segments of color wheel 402 may be selected to optimize the color gamut width and color-balance of the images reproduced by the display system and/or to maximize the over-all brightness of the images.

Figure 3:
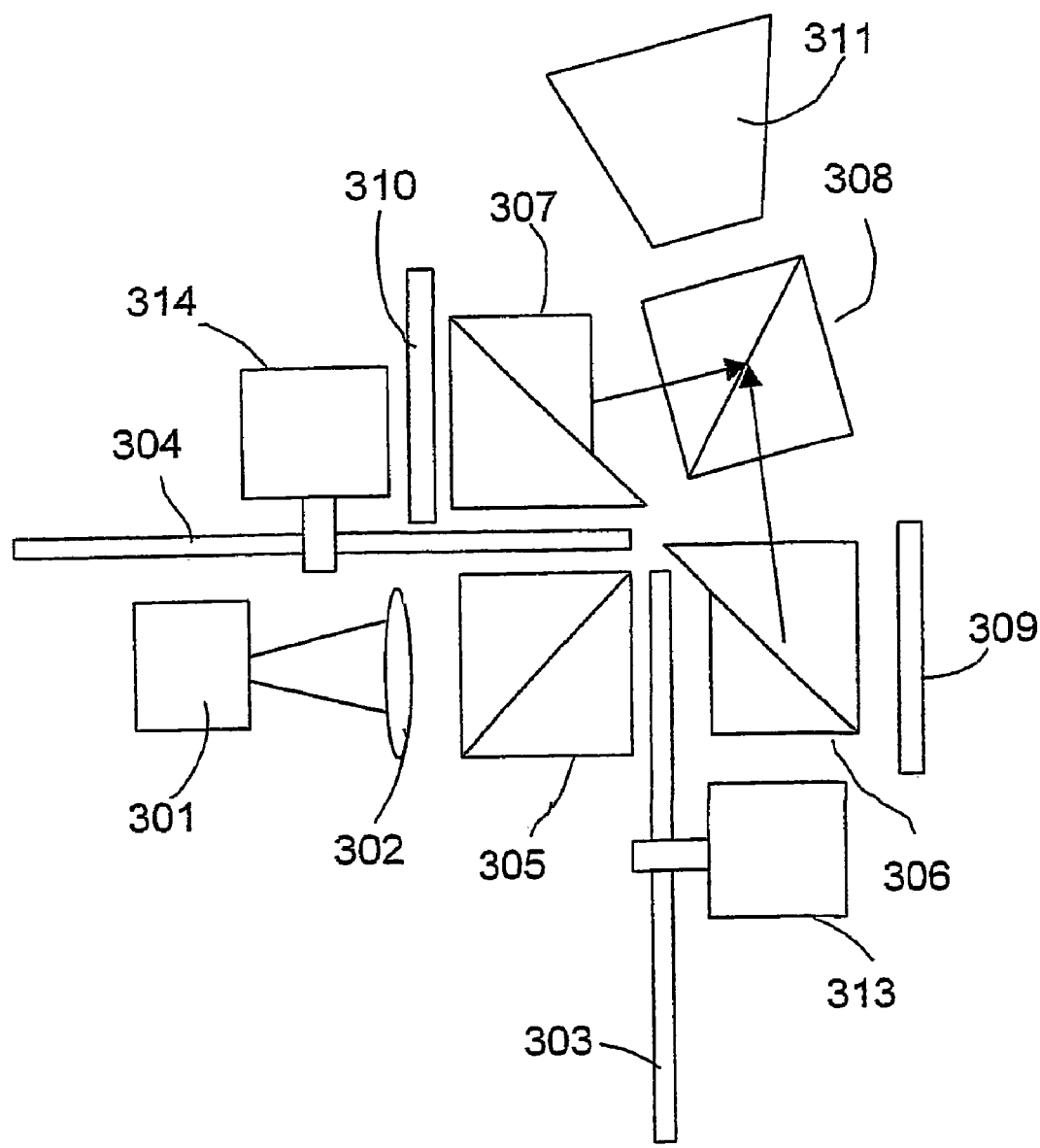
FIG. 3 is a schematic, cross-sectional, top-view illustration of an optical engine configuration of a color projection display system, using two DMD™ SLM panels and two color-switching mechanisms, in accordance with exemplary embodiments of the invention.

It will be appreciated by persons skilled in the art that other features of the embodiment of FIG. 4A, not specifically described herein, are substantially analogous to similar features of the embodiments of FIGS. 2 and 3 above.

Figure 6:
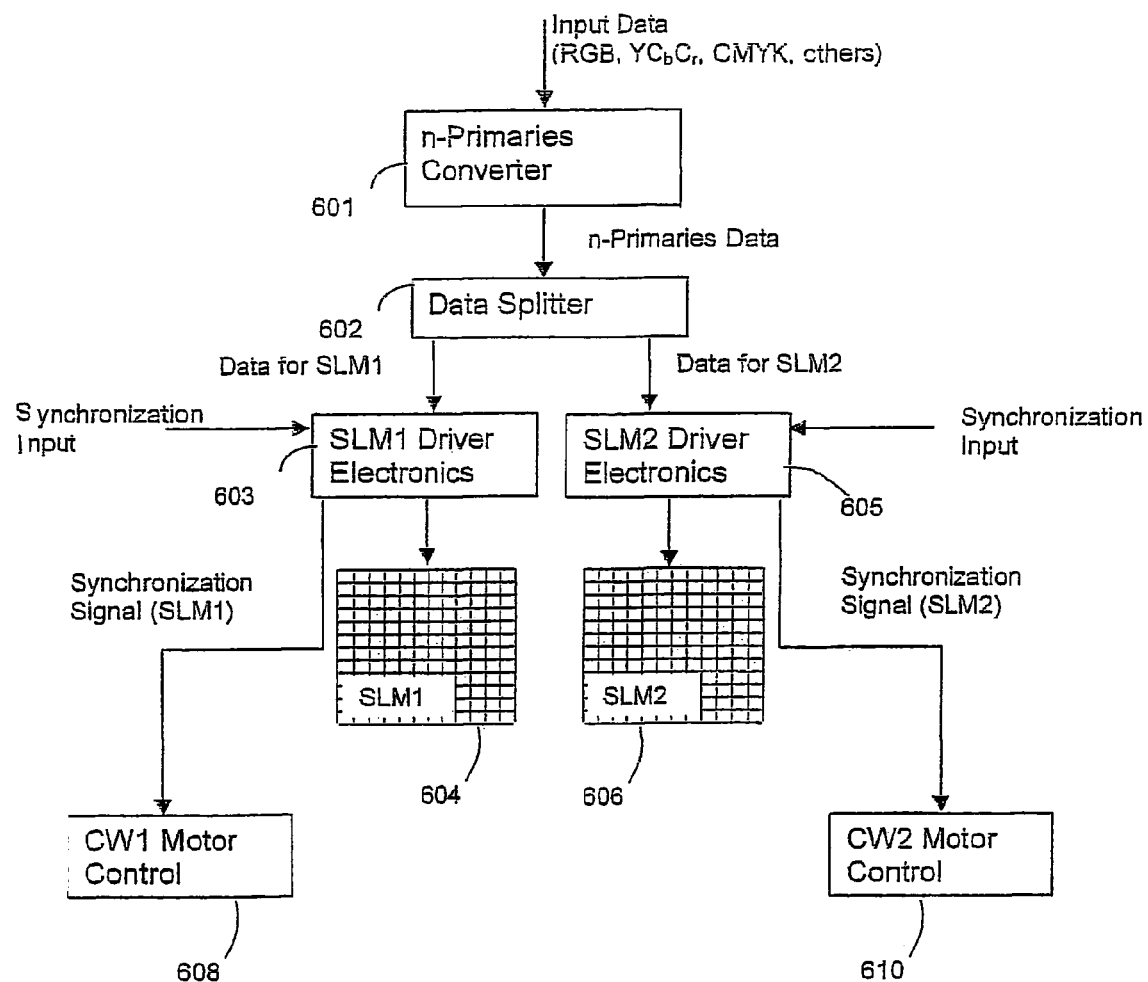
FIG. 6 is schematic, block diagram, illustration of the flow of data in a color projection display system, in accordance with exemplary embodiments of the invention, using an optical engine configuration with two SLM panels, for example, any of the configurations of FIGS. 2, 3 and 4A.

FIG. 6 is a schematic block diagram illustrating the flow of data in a color projection display system using an optical engine configuration with two SLM panels, according to embodiments of the invention. The system of FIG. 6 can be implemented in conjunction with any of the optical engine configurations described above, for example, the configurations of FIGS. 2, 3 and 4A. As shown in FIG. 6, input data to the display system may include any known data format for example, RGB format data, YCbCr format data, representing image data for display monitor applications, or CMYK format data representing image data for printing applications. In embodiments of the invention, an n-primary converter 601 converts the input data into n-primaries format, wherein n is typically greater than Three, for example, six-primary image data, as described in detail in U.S. patent application Ser. No. 10/017,546 and in International Application PCT/IL01/01179, both filed on Dec. 18, 2001, and both entitled "Spectrally Matched Digital Print Proofer", the disclosures of both of which are incorporated herein by reference in their entirety. Alternatively, the input data may be of any other format known in the art, including analog data formats. Data processing by n-primaries converter 601 may be performed as described in U.S. patent application Ser. No. 09/710,895, filed on Nov. 14, 2000, entitled "Device, System And Method For Electronic True Color Display", in International Application PCT/IL01/00527, entitled Device, System And Method For Electronic True Color Display", filed on Jun. 7, 2001, and published as WO 01/95544 on Dec. 13, 2001, and in International Application PCT/IL02/00410, entitled "System and Method of Data Conversion For Wide Gamut Displays", filed May 23, 2002, the disclosures of all of which are incorporated herein by reference in their entirety. Other data processing methods may be used, and displays according to embodiments of the present invention may use other numbers of primary colors, for example, 3 primary colors.

For systems using optical engines with two SLM-panels and two color-wheels, as in the embodiments of FIGS. 2 and 3, a data-splitter 602 separates the n-primates data into two data components, for example, two three-primary image components. A first data component is represented by an input signal provided to a first SLM driver 603, and a second data component is represented by an input signal provided to a second SLM driver 605. Drivers 603 and 605 include circuitry, as is known in the art, to modulate the activation of pixel elements of first and second SLM panels 604 and 606, respectively. SLM drivers 603 and 605 may receive synchronization inputs, which may be used to time the activation of SLM panel 604 and SLM panel 606, respectively, in accordance with a predetermined rate, for example, based on the timing of frames in the input data. As explained above, with reference to FIGS. 2 and 3, precise synchronization between SLM drivers 603 and 605 may not be required because the independent image components reproduced by SLM panels 604 and 606 are temporally integrated by the vision system of the viewer.

The system of FIG. 6 further includes first and second color-switching control units, 608 and 610, respectively, which control the color-switching rate of the two color-switching mechanisms described above with reference to FIGS. 2 and 3. In embodiments of the invention, control units 608 and 610 control the operation of motors of the color-switching mechanisms, each motor rotating a respective color wheel, as described above with reference to FIGS. 2 and 3. Control units 608 and 610 may receive synchronization signals from SLM drivers 603 and 605, respectively, ensuring that the color-switching rates of the respective color-switching mechanisms match the rates at which image components are reproduced by the respective SLM panels 604 and 606.

In alternate embodiments of the invention, the system of FIG. 6 may be implemented in conjunction with an optical engine configuration using only one color-switching mechanism for example, the optical engine configuration described above with reference to FIGS. 4A and 4B. In such altercate embodiments, instead of control units 608 and 610, a single color-switching control unit may be used to control the operation of a motor rotating a color wheel of the color-switching mechanism.

It will be appreciated by persons skilled in the art that the projection display system of FIG. 6 is not limited by the exemplary components and configurations described herein In embodiments of the invention, the functionality of the components of FIG. 6 may be performed by any suitable combination of hardware and/or software, as is known in the art. For example, in some embodiments, converter 601 and data-splitter 602 may be integrated into a single unit. Any other design modifications, in accordance with specific applications of the system, are also within the scope of the invention.

Embodiments of the present invention provide data to a monitor, which typically uses more than three prima colors. For example, International Application PCT/IL01/01179, the disclosure of which is incorporated herein by reference, describes embodiments of a device, system and a method for soft proofing of an image before it is printed onto printed material. Such embodiments can typically display a wider gamut of colors and data corresponding to such wide gamut colors, and/or typically use more than three primaries. Such embodiments can also typically display any color displayed by conventional displays (e.g., displays using conventional RGB data and conventional RGB primaries), as well as additional colors that can be reproduced only by system using more tan three primary colors. Data may need to be converted from conventional data (e.g., RGB data) to a suitable format before being displayed by such a monitor; alternately, such a monitor may perform such conversions.

A display system used with one embodiment of the invention may have an expanded range of colors, due to the use of more than three primaries. A monitor with more than three primaries can be constructed to reproduce improved color images. Embodiments of monitors based on more than three primaries are disclosed in International Application PCT/IL01/00527, entitled "Device, System and Method For Electronic True Color Display", filed Jun. 7, 2001, and published Dec. 13, 2001 as WO 01/95544, assigned to the assignee of the present application, the entire disclosure of which is incorporated herein by reference, and International Application PCT/IL01/01179, entitled "Spectrally Matched Print Proofer," filed Jun. 7, 2001, assigned to the assignee of the present application, the entire disclosure of which is incorporated herein by reference. While the methods and systems disclosed in these patent applications may be used in or with embodiments of the present invention, the system and method of the present invention may also be embodied in conjunction with other n-primary color display technology, wherein n is greater than or equal to three, or with other display technology.

It will be appreciated by persons skilled in the art that the present invention is not limited to what has been particularly shown and described hereinabove. Rather the scope of the present invention is defined only by the claims which follow:

The invention claimed is:

1. A color projection display device for displaying a temporally-integrated more-than-three-primary-color image comprising first and second sequences of temporally-integrateable primary color image components, the device comprising:
   first and second spatial light modulator panels including first and second arrays of pixel elements, respectively;
   an illumination configuration to produce a sequence of a plurality of color filtered light beams having a plurality of filtered wavelength spectrums, respectively; and
   a beam divider/combiner able to:
      produce a plurality of sub-spectrum light beams of at least four different primary colors by separating each color filtered light beam in said sequence of color filtered light beams into a first sub-spectrum beam whose color corresponds to the color of one of the primary color image components in said first sequence of temporally-integrateable components, and a second sub-spectrum beam whose color corresponds to the color of one of the primary color image components in said second sequence of temporally-integrateable components;
      direct the first sub-spectrum beam resulting from each of said plurality of color filtered light beams onto said first spatial light modulator panel, and direct the second sub-spectrum beam resulting from each of said plurality of color filtered light beams onto said second spatial light modulator panel;
      receive a first sequence of patterned colored light beams reflected from said first spatial light modulator panel, each patterned colored light beam in said first sequence of patterned colored light beams carrying one primary color image component of said first sequence of temporally-integrateable primary color image components;
      receive a second sequence of patterned colored light beams reflected from said second spatial light modulator panel, each patterned colored light beam in said second sequence of patterned colored light beams carrying one primary color image component in said second sequence of temporally-integrateable primary color image components; and
      produce a combined output beam carrying both said first and said second sequences of temporally-integrateable primary color image components, by directing both said first and second sequences of patterned colored light beams in an output direction.

2. The device of claim 1 comprising:
   first driving circuitry to receive a first input signal representing said first sequence of temporally-integrateable primary color image components, and selectively activate said first array of pixel elements to produce a first sequence of reflective patterns corresponding to said first sequence of temporally-integrateable primary color image components; and
   second driving circuitry to receive a second input signal representing said second sequence of temporally-integrateable primary color image components, and selectively activate said second array of pixel elements to produce a second sequence of reflective patterns corresponding to said second sequence of temporally-integrateable primary color image components.

3. The device of claim 1, wherein said illumination configuration comprises:
   an illumination unit to produce a light beam of a predetermined wavelength spectrum; and
   a color switching mechanism which sequentially interposes each of a plurality of different color filters in the path of the light beam of said predetermined spectrum, each color filter having a transmission spectrum corresponding to a respective one of said plurality of filtered wavelength spectrums.

4. The device of claim 3, wherein said color switching mechanism comprises a color wheel which accommodates said plurality of color filters and is able to sequentially dispose each of said plurality of color filters in the path of the light beam of said predetermined spectrum.

5. The device of claim 3, wherein the light beam of said predetermined wavelength spectrum comprises a substantially white light beam.

6. The device of claim 3, wherein said plurality of filters comprises at least three filters having transmission spectrums corresponding to at least three filtered wavelength spectrums, respectively.

7. The device of claim 3, wherein said plurality of filters comprises two filters having transmission spectrums corresponding to two filtered wavelength spectrums, respectively.

8. The device of claim 1 comprising at least one projection lens which projects said combined output beam onto a viewing screen to reproduce said temporally-integrated color image.

9. The device of claim 1, wherein said at least four different primary colors comprise at least five different primary colors.

10. The device of claim 9, wherein said at least five different primary colors comprise at least six different primary colors.

11. The device of claim 1, wherein at least one of said first and second arrays of pixel elements comprises an array of selectively activated digital micro-mirror pixel elements.

12. The device of claim 1, wherein at least one of said first and second arrays of pixel elements comprises an array of selectively activated liquid-crystal-on-silicone pixel elements.

13. A color projection display system for displaying a temporally-integrated more-than-three-primary-color image comprising first and second sequences of temporally-integrateable primary color image components, the system comprising:
   first and second spatial light modulator panels including first and second arrays of pixel elements, respectively;
   a data converter to convert an input signal representing three-primary-color image pixel data into a converted data signal representing said temporally-integrated color image;
   a data splitter to separate said converted data signal into first and second input signals representing said first and second sequences of temporally-integrateable primary color image components, respectively;
   first driving circuitry to receive said first input signal, and selectively activate said first array of pixel elements to produce a first sequence of reflective patterns corresponding to said first sequence of temporally-integrateable primary color image components;
   second driving circuitry to receive said second input, and selectively activate said second array of pixel elements to produce a second sequence of reflective patterns corresponding to said second sequence of temporally-integrateable primary color image components;
   an illumination configuration to produce a sequence of a plurality of color filtered light beams having a plurality of filtered wavelength spectrums, respectively; and a beam divider/combiner able to:

produce a plurality of sub-spectrum light beams of at least four different primary colors by separating each color filtered light beam in said sequence of color filtered light beams into a first sub-spectrum beam whose color corresponds to the color of one of the primary color image components in said first sequence of temporally-integrateable components, and a second sub-spectrum beam whose color corresponds to the color of one of the primary color image components in said second sequence of temporally-integrateable components;

direct the first sub-spectrum beam resulting from each of said plurality of color filtered light beams onto said first spatial light modulator panel, and the second sub-spectrum beam resulting from each of said plurality of color filtered light beams onto said second spatial light modulator panel;

receive a first sequence of patterned colored light beams reflected from said first spatial light modulator panel, each patterned colored light beam in said first sequence of patterned colored light beams carrying one primary color image component of said first sequence of temporally-integrateable primary color image components;

receive a second sequence of patterned colored light beams reflected from said second spatial light modulator panel, each patterned colored light beam in said second sequence of patterned colored light beams carrying one primary color image component in said second sequence of temporally-integrateable primary color image components; and produce a combined output beam carrying both said first and said second sequences of temporally-integrateable primary color image components, by directing both said first and second sequences of patterned colored light beams in an output direction.

14. The system of claim 13, wherein said illumination configuration comprises:

an illumination unit to produce a light beam of a predetermined wavelength spectrum; and a color switching mechanism which sequentially interposes each of a plurality of different color filters in the path of the light beam of said predetermined spectrum, each color filter having a transmission spectrum corresponding to a respective one of said plurality of filtered wavelength spectrums.

15. The system of claim 14, wherein said plurality of filters comprises at least three filters having transmission spectrums corresponding to at least three filtered wavelength spectrums, respectively.

16. The system of claim 14, wherein said plurality of filters comprises two filters having transmission spectrums corresponding to two filtered wavelength spectrums, respectively.

17. The system of claim 14 comprising a color-switching controller to control the rate at which said color-switching mechanism sequentially interposes said plurality of color filters in the path of the light beam of said predetermined spectrum.

18. The system of claim 17, wherein said color-switching controller is able to be synchronized with said first and second driving circuitry, thereby to adapt the rate at which said color-switching mechanism sequentially interposes said plurality of color filters to the rate at which said first and second driving circuitry produce said first and second sequences of reflective patterns.

19. The system of claim 13, wherein said three-primary-color image pixel data comprises image pixel data in a format selected from the group consisting of RGB, YCbCr and CMYK.

* * * * *